United States Patent
Kuang

(10) Patent No.: US 9,487,432 B2
(45) Date of Patent: Nov. 8, 2016

(54) HIGH REFRACTIVITY AND HIGH DISPERSION OPTICAL GLASS, ELEMENT AND INSTRUMENT

(71) Applicant: CDGM GLASS CO., LTD., Chengdu, Sichuan (CN)

(72) Inventor: Bo Kuang, Chengdu (CN)

(73) Assignee: CDGM GLASS CO., LTD, Sichuan (CN)

( * ) Notice: Subject to any disclaimer, the term of this patent is extended or adjusted under 35 U.S.C. 154(b) by 0 days.

(21) Appl. No.: 14/600,559

(22) Filed: Jan. 20, 2015

(65) Prior Publication Data

US 2015/0203395 A1 Jul. 23, 2015

(30) Foreign Application Priority Data

Jan. 22, 2014 (CN) .......................... 2014 1 00288019

(51) Int. Cl.
*C03C 3/068* (2006.01)

(52) U.S. Cl.
CPC ..................................... *C03C 3/068* (2013.01)

(58) Field of Classification Search
CPC ..................................................... C03C 3/068
See application file for complete search history.

(56) References Cited

U.S. PATENT DOCUMENTS

| 2009/0325779 A1* | 12/2009 | Negishi ...................... C03C 4/02 501/78 |
| 2010/0081555 A1* | 4/2010 | Negishi ................... C03B 17/06 501/78 |
| 2011/0028300 A1* | 2/2011 | Zou ........................ C03B 17/062 501/78 |

FOREIGN PATENT DOCUMENTS

| JP | 2012229148 A | * | 11/2012 | ............. C03C 3/068 |
| JP | 2012236754 A | * | 12/2012 | ............. C03C 3/068 |
| JP | 2014221704 A | * | 11/2014 | ............. C03C 3/068 |
| WO | WO 2009096439 A1 | * | 8/2009 | ........... C03B 17/062 |
| WO | WO 2013094619 A1 | * | 6/2013 | ............. C03C 3/068 |

* cited by examiner

*Primary Examiner* — Elizabeth A Bolden
(74) *Attorney, Agent, or Firm* — Oliff PLC

(57) ABSTRACT

A high refractivity and high dispersion optical glass with light transmissivity and good devitrification resistance. The high refractivity and high dispersion optical glass, including: 1 wt % to 13 wt % of $SiO_2$, 6 wt % to 15 wt % of $B_2O_3$, 5 wt % to 22 wt % of $TiO_2$, 35 wt % to 60 wt % of $La_2O_3$, 1 wt % to 15 wt % of $Gd_2O_3$, 2 wt % to 10 wt % of $ZrO_2$, 1 wt % to 15 wt % of $Nb_2O_5$, 0.5 wt % to 8 wt % of ZnO, 0 to 8 wt % of $WO_3$ and 0 to 10 wt % of $Y_2O_3$, with $Ta_2O_5$ and $GeO_2$ excluded. The optical glass has degree of pigmentation and light transmissivity due to no pigmenting $Bi_2O_3$, and has low cost due to no valuable oxides such as $Ta_2O_5$ and $GeO_2$. The optical glass has devitrification resistance with a refractive index of 1.95-2.07 and Abbe number of 25-35.

12 Claims, No Drawings

HIGH REFRACTIVITY AND HIGH DISPERSION OPTICAL GLASS, ELEMENT AND INSTRUMENT

FIELD OF THE INVENTION

The present invention relates to a kind of high refractivity and high dispersion optical glass, in particular to a kind of high refractivity and high dispersion optical glass with refractivity (nd) and Abbe number (vd) of 1.95-2.07 and 25-35 respectively, as well as to the preform, element and instrument made of such optical glass.

DESCRIPTION OF THE PRIOR ART

Recently, two development trends of digital imaging devices are being more compact in size and slim and light as possible for easy portability, and presenting higher imaging quality. The optical glass with refractivity of above 1.95 is known as high refractive index glass which, when applied to optical imaging devices, could greatly shorten the focal length and reduce the lens length required for imaging, so that the lens size could be decreased significantly. The invention of high refractive index optical glass makes it possible to realize small, slim and light lens. Besides, the high refractive index optical glass, when applied to imaging lenses, could improve the zoom capacity of lenses and thus provide a broad zoom range of slim and light imaging devices. Furthermore, the high refractive index optical glass, when coupled with a kind of low refractive index glass (ED glass for short), could effectively reduce the aberration including the chromatic aberration, and improve the imaging quality of imaging devices.

Generally, in terms of the light transmission, the high refractive index optical glass has lower blue light transmissivity than the low refractive index optical glass. For instance, one DSLR camera lens often comprises several to a dozen of optical elements of lens; if the high refractive index optical glass with lower blue light transmissivity is used, the total amount of blue light arriving at the sensor could be much less than the light with other wavelengths, which brings great difficulty in restoring the color of pictures. In the field of optical design, $\tau 400$ nm is usually used to indicate the blue light transmissivity; the higher $\tau 400$ nm is, the higher the blue light transmissivity becomes.

In order to realize a higher refractive index of high refractive index optical glass, large amount of high-refractivity rare earth oxides may be added, such as $La_2O_3$, $Y_2O_3$ and $Gd_2O_3$. However, these oxides are very expensive and the price thereof is expected to increase with the trend of rare earth depletion in China. $TiO_2$ is commonly used as an industrial chemical, which is relatively cheaper than rare earth oxides. Once used, $TiO_2$ could improve the refractive index and the chemical stability of glass. Therefore, a certain amount of $TiO_2$ is often added in the high refractive index optical glass in lieu of rare earth oxides to reduce the cost of glass. If an excessive amount of $TiO_2$ is added, however, $TiO_2$ will pigment the glass during the melting process and severely reduce the light transmissivity of the glass. It is thus very important to the sustainable development of optical glass industry to study how to increase the content of $TiO_2$ in glass without compromising the good light transmissivity.

In the process of manufacturing the optical element of lens, a piece of optical glass is often cut into a glass blank as per the pressing specifications, placed in to a high temperature mold, heated to 850° C.-1000° C., dependent on the yield point temperature, Ts, maintained for 15-20 min until the glass is softened, and then pressed into an optical blank. After this, the optical blank will submit to subsequent procedures such as grinding and polishing. This process is known as secondary pressing in the field of optical manufacturing. During the secondary processing, the temperature rise is generally controlled between devitrification range of glass, which requiring good devitrification resistance of glass including the surface and internal devitrification resistance. With lower content of glass network former such as $SiO_2$ and $B_2O_3$ than the low refractive index glass, the high refractive index optical glass usually has lower level of devitrification than the low refractive index optical glass. This means that the proportion of glass components should be reasonable to prevent devitrification of glass during the production and secondary pressing processes.

DISCLOSURE OF THE INVENTION

A technical problem to be solved by the invention is to provide a kind of high refractivity and high dispersion optical glass with excellent light transmissivity and good devitrification resistance.

To solve the technical problem, the invention provides a kind of high refractivity and high dispersion optical glass comprising the following components by weight percentage: 1 to 13% of $SiO_2$, 6 to 15% of $B_2O_3$, 5 to 22% of $TiO_2$, 35 to 60% of $La_2O_3$, 1 to 15% of $Gd_2O_3$, 2 to 10% of $ZrO_2$, 1 to 15% of $Nb_2O_5$, 0.5 to 8% of ZnO, 0 to 8% of $WO_3$ and 0 to 10% of $Y_2O_3$, with $Ta_2O_5$ and $GeO_2$ excluded.

Furthermore, the high refractivity and high dispersion optical glass comprises the following components by weight percentage: 0 to 0.1% of $Sb_2O_3$ and 0 to 8% of RO, wherein R represents one or more of Ba, Sr, Ca and Mg.

Furthermore, the high refractivity and high dispersion optical glass comprises the following components by weight percentage: 1 to 13% of $SiO_2$, 6 to 15% of $B_2O_3$, 5 to 22% of $TiO_2$, 35 to 60% of $La_2O_3$, 0 to 10% of $Y_2O_2$, 1 to 15% of $Gd_2O_3$, 2 to 10% of $ZrO_2$, 1 to 15% of $Nb_2O_5$, 0.5 to 8% of ZnO, 0 to 8% of $WO_3$, 0 to 0.1% of $Sb2_2O_3$, and 0 to 8% of RO, wherein R represents one or more of Ba, Sr, Ca and Mg.

Furthermore, the high refractivity and high dispersion optical glass comprises the following components by weight percentage: 1 to 11% of $SiO_2$ and/or 8 to 13% of $B_2O_3$ and/or 11 to 17% of $TiO_2$ and/or 38 to 55% of $La_2O_3$ and/or 1 to 7% of $Y_2O_3$ and/or 3 to 13% of $Gd_2O_3$ and/or 3 to 9% of $ZrO_2$ and/or 2 to 14% of $Nb_2O_5$ and/or 0.5 to 6% of ZnO and/or 0 to 0.05% of $Sb_2O_3$ and/or 0 to 5% of RO, wherein R represents one or more of Ba, Sr, Ca and Mg.

Furthermore, the high refractivity and high dispersion optical glass comprises the following components by weight percentage: 1 to 7% of $SiO_2$ and/or 8 to 11% of $B_2O_3$ and/or 13 to 16% of $TiO_2$ and/or 40 to 50% of $La_2O_3$ and/or 1 to 5% of $Y_2O_3$ and/or 5 to 12% of $Gd_2O_3$ and/or 4 to 8% of $ZrO_2$ and/or 5 to 10% of $Nb_2O_5$ and/or 1 to 4% of ZnO.

Furthermore, $2.5<La_2O_3/(Y_2O_3+Gd_2O_3+ZrO_2)<7$.

Furthermore, $0.9<(SiO_2+B_2O_3)/TiO_2<1.5$.

Furthermore, the refractivity of optical glass is 1.95 to 2.07, and the Abbe number is 25 to 35.

Furthermore, the transmissivity at 400 nm position of 10 mm-thick sample glass which is measured with the method specified in GB/T7962.12-2010, is 68% and above.

Furthermore, the surface devitrification resistance is at level B or higher and the internal devitrification resistance is at level A.

The glass preform made of the high refractivity and high dispersion optical glass.

The optical element made of the high refractivity and high dispersion optical glass.

The optical instrument made of the high refractivity and high dispersion optical glass.

The invention is advantageous in that based on the reasonable proportion of the components, the optical glass of the present invention has excellent degree of pigmentation and light transmissivity due to no pigmenting $Bi_2O_3$, and has low cost due to no valuable oxides such as $Ta_2O_5$ and $GeO_2$. The optical glass of the present invention has good devitrification resistance with refractivity ($n_d$) of 1.95-2.07 and Abbe number ($V_d$) of 25-35.

Specific Embodiments

Each component of the optical glass provided by the invention is described hereunder, and the content thereof is represented by wt % unless otherwise stated.

As an oxide forming glass network, $B_2O_3$ is an essential component forming the glass network, especially in the high refractivity lanthanide glass, $B_2O_3$ is the main component for obtaining the stable glass. When the content of $B_2O_3$ is lower than 6%, the melting behavior of glass is liable to be poor, and the devitrification resistance is liable to be undesirable; when the content of $B_2O_3$ exceeds 15%, the glass refractivity is unable to reach the design objective; therefore, the content of $B_2O_3$ is limited at 6-15%, preferably 8-13%, more preferably 8-11%.

$SiO_2$ is also an oxide forming glass network, and an appropriate amount of $SiO_2$ can increase the high temperature viscosity and improve the devitrification resistance and chemical stability of the glass. When the content of $SiO_2$ is lower than 1%, the effects are not obvious; when the content of $SiO_2$ exceeds 13%, the refractivity is liable to be decreased, and the devitrification resistance be poor; therefore, the content of $SiO_2$ is 1-13%, preferably 1-11%, further preferably 1-7%.

As a common high refractivity oxide, $TiO_2$ can be applied to the glass to gain high refractivity, which can substitute valuable oxides such as $Ta_2O_5$ and $La_2O_3$ to reduce the glass cost and the rare earth usage. However, excessive $TiO_2$ is liable to significantly increase the glass pigmentation. Through researches, the inventor found that the valence state or structural change of Ti ionic in the melt can be controlled to avoid glass pigmentation when the content of $TiO_2$ is maintained at $0.9<(SiO_2+B_2O_3)/TiO2<1.5$. Therefore, by controlling the content of $TiO_2$ at $0.9<(SiO_2+B_2O_3)/TiO2<1.5$, the glass with good light transmissivity is liable to be obtained while sufficient $TiO_2$ is applied. If $(SiO_2+B_2O_3)/TiO2\leq0.9$, the light transmissivity of the glass is liable to be reduced; if $(SiO_2+B_2O_3)/TiO2\geq1.5$, the optical constant of the optical glass provided by the invention is unable to reach the design objective. The content of $TiO_2$ in the invention is 5-22%, preferably 11-17%, further preferably 12-16%.

As an effective component for improving the glass refractivity, $La_2O_3$ can effectively improve the chemical stability and devitrification resistance of the glass, but the optical constant is unable to be obtained when the content of $La_2O_3$ is lower than 35%; when the content thereof is higher than 60%, the devitrification resistance is liable to be increased; therefore, the content of $La_2O_3$ is 35-60%, preferably 38-55%, further preferably 40-50%.

$Y_2O_3$, $Gd_2O_3$ and $ZrO_2$ are high refractivity oxides, and the glass refractivity can be improved due to the application of proper amount of such oxides; more importantly, the devitrification of $La_2O_3$ is liable to be greatly inhibited to some extent when the three oxides coexist with $La_2O_3$. Through researches, the inventor found that the maximum devitrification resistance, including the internal devitrification resistance and surface devitrification resistance, reaches when the content relation among the above four oxides satisfy $2.5<La2O3/(Y_2O_3+Gd_2O_3+ZrO_2)<7$. Also, if the content of $Y_2O_3$ exceeds 10%, the required optical constant is unable to be obtained, so the content of $Y_2O_3$ is 0-10%, preferably 1-7%, further preferably 1-5% when the refractive index nd of the glass is greater than 2.0; if the content of $Gd_2O_3$ exceeds 15%, the specific gravity of the glass is liable to be increased, while the devitrification resistance is liable to be decreased, so the content of $Gd_2O_3$ is 1-15%, preferably 3-13%, further preferably 5-12%; if the content of $ZrO_2$ exceeds 10%, the melting temperature of the glass is liable to be risen, and the devitrification resistance is liable to be decreased, so the content of $ZrO_2$ is 2-10%, preferably 3-9%, further preferably 4-9%.

$Nb_2O_3$ is not only the essential component for obtaining the high refractivity and high dispersion provided by the invention, but also the component that can improve the chemical durability of glass. If the content of $Nb_2O_3$ is lower than 1%, the optical constant is unable to reach the design requirements; if the content of $Nb_2O_3$ exceeds 15%, the devitrification resistance of the glass is liable to be decreased; therefore, the content of $Nb_2O_3$ is 1-15%, preferably 2-14%, further preferably 5-10%.

ZnO can reduce thermal expansion coefficient and increase chemical and thermal stability as well as melting behavior of the glass. If the content of ZnO exceeds 8%, the devitrification of the glass increases; if the content is less than 0.5%, the transition temperature of the glass goes up. Therefore, the content of ZnO is 0.5-8%, preferably 0.5-6%, further preferably 1-4%.

$WO_3$ is a high-refractivity oxide, after being added into the glass, which can effectively enhance the refractive index and dispersion of the glass. However, if the content of $WO_3$ exceeds 8%, the glass transmissivity will be degraded. Therefore, $WO_3$ is at a content of 0-8%, preferably not added.

RO (R represents one or more of Ba, Sr, Ca and Mg) is a kind of alkaline-earth metal oxide, and after being added into the glass, it may improve the stability and melting behavior of the glass, but excessive adding will cause more severe phase separation, so one element or combinations of several elements may be added into glass composition Therefore, the RO is at a total content of 0-8%, preferably 0-5%, further preferably not added.

$Sb_2O_3$, as a fining agent in the glass provided by the invention, is at a content of 0-0.1%, preferably 0-0.05%, further preferably not added.

Through a great number of experiments and researches on the relationship between components contents, a kind of low-cost optical glass, with excellent light transmissivity and good devitrification resistance, refractivity ($n_d$) of 1.95-2.07 and Abbe number ($v_d$) of 25-35, is obtained in this invention.

In the following paragraphs, the performance of the optical glass provided in this invention will be described:

The refractivity and Abbe number are measured as per the *Test Methods of Colorless Optical Glass* (GB/T 7962.1-2010): *Refractive Index and Coefficient of Dispersion*.

The transmissivity of 10 mm-thick sample glass at 400 nm, τ400 nm for short, is measured with the method specified in GB/T7962.12-2010.

The internal devitrification resistance of the glass is tested with the following method:

Cut the experimental glass into 30 mm×30 mm×10 mm of foliated blanks, place in the heating furnace with temperature around 270° C. above Tg of the glass, keep it for 30 minutes, and then take out the samples for annealing. When the samples are cooled down, polish these samples and then examine them under a microscope with the following judgment standards:

1) Devitrification particles, which are not visible to the naked eyes, are defined as Level "A";
2) Devitrification particles, which are visible to the naked eyes with small quantity but scattered, are defined as Level "B";
3) Devitrification particles, which are visible to the naked eyes with larger dispersion or more intensive and small size, are defined as Level "C";
4) Large and intensive devitrification particles are defined as Level "D";
5) Complete devitrification is defined as Level "E".

The surface devitrification resistance (DCS) of the glass is tested with the following method:

Cut the experimental glass into 30 mm×30 mm×10 mm of foliated blanks for precision grinding, paint $B_2N_3$ on the surface, place in the heating furnace with temperature around 270° C. above Tg of the glass, keep it for 30 minutes, and then take out the samples for annealing. When the samples are cooled down, remove the $B_2N_3$ coating, observe the devitrified spots under the light, rub off the spots with grinding prototype, and record the spot depth with the following judgment standards:

1) Glass without devitrified spots on the surface, indicating good devitrification resistance, is defined as Level "A";
2) Glass with devitrified spots on the surface, but the spot area occupying less than 5% of the entire surface area and spot depth not exceeding 0.5 mm, is defined as Level "B";
3) Glass with devitrified spots on the surface, but the spot area occupying 5%-30% of the entire surface area and spot depth ranging from 0.5 mm to 0.8 mm, is defined as Level "C";
4) Glass with devitrified spots on the surface, but the spot area occupying more than 30% of the entire surface area and spot depth exceeding 0.8 mm, is defined as Level "D";

Verified by the test, the optical glass provided by the invention has the following properties that: the refractivity (nd) is 1.95-2.07, Abbe number (vd) is 25-35, Level B or higher surface devitrification resistance reaches, Level A internal devitrification resistance, and 68% or above τ400 nm.

The invention also provides an optical preform and optical element made of said optical glass with the method that is well known by technical personnel in the art. Due to high refractive index and high dispersion of said optical glass, the optical element is also characterized by high refractive index and high dispersion and is applicable to digital cameras, digital video cameras, camera phones, etc.

Embodiments

To further understand the technical scheme of the present invention, embodiments of the optical glass provided in the invention are described as below. What shall be noted is that these embodiments do not limit the scope of this invention.

The optical glass (embodiments 1~40) shown in Tables 1-4 are formed by weighting based on the proportions of each embodiment in Tables 1-4, mixing the ordinary raw materials for the optical glass (such as oxide, hydroxide, carbonate and nitrate), placing the mixed raw materials in a platinum crucible, melting at a certain scope of temperature, obtaining homogeneous molten glass without bubbles and undissolved substances after melting, clarification, stirring and homogenization, shaping the molten glass in a mould and perform annealing.

The results of composition, refractivity (nd), Abbe number (vd), surface devitrification resistance, internal devitrification resistance and τ400 nm of embodiments 1-40 of the invention are shown in Tables 1-4. The composition of each component is represented by wt % in such tables, in which A refers to the value of $(SiO_2+B_2O_3)/TiO_2$ and B refers to the value of $La_2O_3/(Y_2O_3+Gd_2O_3+ZrO_2)$.

TABLE 1

| Composition | Embodiments | | | | | | | | | |
|---|---|---|---|---|---|---|---|---|---|---|
| | 1 | 2 | 3 | 4 | 5 | 6 | 7 | 8 | 9 | 10 |
| $SiO_2$ | 4.8 | 4.7 | 2.8 | 3 | 3.1 | 3.15 | 3.35 | 6.85 | 3.55 | 4.6 |
| $B_2O_3$ | 8.6 | 9.1 | 12.7 | 12.7 | 8.3 | 8.25 | 8.35 | 10.8 | 9.5 | 8.5 |
| $La_2O_3$ | 41.9 | 45.8 | 43.85 | 46 | 59.8 | 57.75 | 56.15 | 55.15 | 59.85 | 45.1 |
| $Gd_2O_3$ | 9.4 | 8 | 12.4 | 11.9 | 8.6 | 4.2 | 5.1 | 6.3 | 4.25 | 5 |
| $TiO_2$ | 13.8 | 13.5 | 11.8 | 15 | 11.1 | 11.35 | 11.4 | 11.85 | 11.95 | 12.8 |
| $Nb_2O_5$ | 8.5 | 8 | 11.45 | 5.1 | 2.5 | 2.65 | 3.25 | 2.45 | 2.15 | 9 |
| $Y_2O_3$ | 0 | 1 | 1.4 | 1.5 | 1.3 | 1.45 | 1.55 | 2.15 | 1.15 | 5 |
| $ZrO_2$ | 7 | 5.6 | 3.1 | 3.5 | 3.5 | 8.7 | 8.45 | 3.55 | 3.25 | 5 |
| ZnO | 1 | 1.5 | 0.5 | 1.3 | 1.8 | 2.5 | 2.4 | 0.9 | 4.35 | 1 |
| BaO | 4.99 | 2.79 | 0 | 0 | 0 | 0 | 0 | 0 | 0 | 1 |
| SrO | 0 | 0 | 0 | 0 | 0 | 0 | 0 | 0 | 0 | 0 |
| CaO | 0 | 0 | 0 | 0 | 0 | 0 | 0 | 0 | 0 | 0 |
| MgO | 0 | 0 | 0 | 0 | 0 | 0 | 0 | 0 | 0 | 0 |
| $WO_3$ | 0 | 0 | 0 | 0 | 0 | 0 | 0 | 0 | 0 | 0 |
| $Sb_2O_3$ | 0.01 | 0.01 | 0 | 0 | 0 | 0 | 0 | 0 | 0 | 0 |
| Total RO | 4.99 | 2.79 | 0 | 0 | 0 | 0 | 0 | 0 | 0 | 1 |
| A | 0.97 | 1.02 | 1.31 | 1.05 | 1.03 | 1.00 | 1.03 | 1.49 | 1.09 | 1.02 |
| B | 2.55 | 3.14 | 2.59 | 2.72 | 4.46 | 4.02 | 3.72 | 4.60 | 6.92 | 3.01 |
| Total | 100 | 100 | 100 | 100 | 100 | 100 | 100 | 100 | 100 | 100 |
| nd | 1.99980 | 1.99870 | 2.03387 | 2.02459 | 2.06571 | 2.03587 | 2.03401 | 2.00186 | 2.00541 | 1.99720 |
| vd | 28.51 | 28.92 | 29.05 | 29.23 | 31.42 | 33.40 | 33.18 | 34.42 | 28.72 | 29.19 |
| Internal devitrification resistance | A | A | A | A | A | A | A | A | A | A |

TABLE 1-continued

| Composition | Embodiments | | | | | | | | | |
|---|---|---|---|---|---|---|---|---|---|---|
| | 1 | 2 | 3 | 4 | 5 | 6 | 7 | 8 | 9 | 10 |
| Heat preservation temperature of internal devitrification resistance test | 960 | 965 | 970 | 965 | 970 | 975 | 975 | 960 | 980 | 980 |
| Surface devitrification resistance | A | A | A | A | A | B | B | B | B | A |
| Heat preservation temperature of surface devitrification resistance test | 960 | 965 | 970 | 965 | 970 | 975 | 975 | 960 | 980 | 980 |
| τ400 nm (%) | 71.9 | 74.3 | 72.5 | 72.3 | 71.1 | 70.1 | 70.3 | 73.4 | 71.5 | 72.0 |

TABLE 2

| Composition | Embodiments | | | | | | | | | |
|---|---|---|---|---|---|---|---|---|---|---|
| | 11 | 12 | 13 | 14 | 15 | 16 | 17 | 18 | 19 | 20 |
| $SiO_2$ | 4.35 | 4.5 | 5.1 | 5.35 | 5.85 | 6.1 | 10.85 | 9.15 | 4.6 | 6.95 |
| $B_2O_3$ | 9.25 | 9 | 9.1 | 9.85 | 11.25 | 8.15 | 8.15 | 8.85 | 8.5 | 11.45 |
| $La_2O_3$ | 43.45 | 47.8 | 46.35 | 48.35 | 49.15 | 44.45 | 45.15 | 46.25 | 42 | 50.55 |
| $Gd_2O_3$ | 4.15 | 8 | 8.35 | 7.15 | 4.65 | 7.05 | 9.15 | 7.95 | 8 | 8.75 |
| $TiO_2$ | 14.95 | 12.5 | 13.15 | 14.25 | 15.35 | 15.65 | 13.75 | 13.85 | 14.49 | 13.65 |
| $Nb_2O_5$ | 8.35 | 8.3 | 7.35 | 4.95 | 5.5 | 8.25 | 3.45 | 3.65 | 8.5 | 2.1 |
| $Y_2O_3$ | 6.95 | 1 | 2.85 | 5.35 | 3.25 | 4.15 | 2.15 | 3.65 | 2 | 1.85 |
| $ZrO_2$ | 3.85 | 5.6 | 6.25 | 4.05 | 3.95 | 5.15 | 3.35 | 5.35 | 6 | 4.15 |
| ZnO | 4.7 | 0.5 | 1.5 | 0.7 | 1.05 | 1.05 | 4 | 1.3 | 1 | 0.55 |
| BaO | 0 | 2.8 | 0 | 0 | 0 | 0 | 0 | 0 | 4.9 | |
| SrO | 0 | 0 | 0 | 0 | 0 | 0 | 0 | 0 | 0 | |
| CaO | 0 | 0 | 0 | 0 | 0 | 0 | 0 | 0 | 0 | |
| MgO | 0 | 0 | 0 | 0 | 0 | 0 | 0 | 0 | 0 | |
| $WO_3$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0.01 | 0 |
| Total RO | 0 | 2.8 | 0 | 0 | 0 | 0 | 0 | 0 | 4.9 | 0 |
| A | 0.91 | 1.08 | 1.08 | 1.07 | 1.11 | 0.91 | 1.38 | 1.30 | 0.90 | 1.35 |
| B | 2.91 | 3.27 | 2.66 | 2.92 | 4.15 | 2.72 | 3.08 | 2.73 | 2.63 | 3.43 |
| Total | 100 | 100 | 100 | 100 | 100 | 100 | 100 | 100 | | 100 |
| nd | 2.01796 | 1.99570 | 2.00847 | 2.02426 | 1.98239 | 2.04494 | 1.95394 | 1.97079 | 2.0051 | 1.96997 |
| vd | 27.62 | 29.40 | 28.11 | 28.63 | 33.49 | 26.92 | 34.56 | 32.52 | 28.13 | 34.26 |
| Internal devitrification resistance | A | A | A | A | A | A | A | A | A | A |
| Heat preservation temperature of internal devitrification resistance test | 975 | 960 | 980 | 975 | 970 | 975 | 975 | 980 | 975 | 970 |
| Surface devitrification resistance | A | A | A | A | A | A | A | A | A | A |
| Heat preservation temperature of surface devitrification resistance test | 975 | 960 | 980 | 975 | 970 | 975 | 975 | 980 | 975 | 970 |

TABLE 2-continued

| | Embodiments | | | | | | | | | |
|---|---|---|---|---|---|---|---|---|---|---|
| Composition | 11 | 12 | 13 | 14 | 15 | 16 | 17 | 18 | 19 | 20 |
| τ400 nm (%) | 71.2 | 75.0 | 70.5 | 70.4 | 78.2 | 69.8 | 80.3 | 78.2 | 71.0 | 78.6 |

TABLE 3

| | Embodiments | | | | | | | | | |
|---|---|---|---|---|---|---|---|---|---|---|
| Composition | 21 | 22 | 23 | 24 | 25 | 26 | 27 | 28 | 29 | 30 |
| $SiO_2$ | 6.0 | 7.75 | 5.1 | 5 | 5.85 | 6.1 | 9.35 | 10.15 | 6.5 | 6.95 |
| $B_2O_3$ | 7.1 | 8.25 | 9.1 | 7.8 | 11.25 | 8.15 | 7.05 | 8.05 | 6.5 | 11.45 |
| $La_2O_3$ | 44 | 52.65 | 45.85 | 42.5 | 47.15 | 44.15 | 42.5 | 46.25 | 42 | 50.55 |
| $Gd_2O_3$ | 10 | 4.25 | 8.35 | 11.9 | 4.65 | 7.05 | 8.15 | 7.95 | 8 | 8.05 |
| $TiO_2$ | 14 | 12.3 | 13.15 | 14 | 13.35 | 15.65 | 12.75 | 12.5 | 14.4 | 13.65 |
| $Nb_2O_5$ | 6.5 | 2.45 | 5.35 | 3.2 | 5.5 | 8.05 | 3.45 | 2.65 | 8.6 | 2.1 |
| $Y_2O_3$ | 0.5 | 6.55 | 2.85 | 0 | 3.25 | 3.15 | 2.15 | 1.65 | 2 | 1.85 |
| $ZrO_2$ | 6.0 | 4.25 | 6.25 | 5 | 3.95 | 5.15 | 3.35 | 5.35 | 6 | 3.1 |
| ZnO | 1.09 | 0.55 | 1.5 | 1.1 | 1.05 | 1.05 | 4 | 1.3 | 1 | 0.55 |
| BaO | 4.8 | 0 | 0.5 | 4.5 | 0 | 0.5 | 4 | 0 | 4.5 | 1.75 |
| SrO | 0 | 0 | 0 | 0 | 0 | 0 | 0 | 0 | 0.5 | 0 |
| CaO | 0 | 0 | 1.5 | 0 | 0 | 0 | 0 | 0 | 0 | 0 |
| MgO | 0 | 0 | 0 | 0 | 0 | 0 | 0 | 0 | 0 | 0 |
| $WO_3$ | 0 | 1 | 0.5 | 5 | 4 | 1 | 3.25 | 4.15 | 0 | 0 |
| $Sb_2O_3$ | 0.01 | 0 | 0 | 0 | 0 | 0 | 0 | 0 | 0 | 0 |
| Total RO | 4.8 | 0 | 2 | 4.5 | 0 | 0.5 | 4 | 0 | 5.0 | 1.75 |
| A | 0.94 | 1.30 | 1.08 | 0.91 | 1.28 | 0.91 | 1.29 | 1.46 | 0.90 | 1.35 |
| B | 2.67 | 3.50 | 2.63 | 2.51 | 3.98 | 2.88 | 3.11 | 3.09 | 2.63 | 3.89 |
| Total | 100 | 100 | 100 | 100 | 100 | 100 | 100 | 100 | 100 | 100 |
| Nd | 1.99630 | 1.99901 | 2.00152 | 1.99510 | 1.98168 | 2.04379 | 1.95328 | 1.97425 | 2.0060 | 1.96887 |
| Vd | 28.95 | 30.85 | 28.40 | 28.98 | 33.28 | 26.02 | 34.15 | 33.32 | 28.12 | 34.06 |
| Internal devitrification resistance | A | A | A | A | A | A | A | A | A | A |
| Heat preservation temperature of internal devitrification resistance test | 960 | 965 | 970 | 970 | 975 | 960 | 975 | 960 | 970 | 960 |
| Surface devitrification resistance | A | A | A | A | A | A | A | A | A | A |
| Heat preservation temperature of surface devitrification resistance test | 960 | 965 | 970 | 970 | 975 | 960 | 975 | 960 | 970 | 960 |
| τ400 nm (%) | 71 | 72.1 | 71.8 | 74 | 78.2 | 68.8 | 81.3 | 78.2 | 71.0 | 80.1 |

TABLE 4

| | Embodiments | | | | | | | | | |
|---|---|---|---|---|---|---|---|---|---|---|
| Composition | 31 | 32 | 33 | 34 | 35 | 36 | 37 | 38 | 39 | 40 |
| $SiO_2$ | 3.8 | 3.9 | 3.8 | 4 | 4.5 | 4.7 | 3.0 | 3.9 | 1.5 | 5.2 |
| $B_2O_3$ | 9 | 10.0 | 9 | 9 | 9.5 | 9.2 | 10.9 | 9.9 | 12.5 | 8.4 |
| $La_2O_3$ | 48 | 48 | 47.6 | 49.7 | 45 | 49.4 | 48 | 45.7 | 51.9 | 45 |
| $Gd_2O_3$ | 9.4 | 8 | 10.5 | 6.8 | 8 | 7.1 | 9 | 4.5 | 4.8 | 5.6 |
| $TiO_2$ | 13.2 | 13.7 | 12.8 | 13.3 | 14.5 | 13.3 | 13.0 | 13.2 | 12.2 | 14.2 |

TABLE 4-continued

| Composition | Embodiments | | | | | | | | | |
|---|---|---|---|---|---|---|---|---|---|---|
| | 31 | 32 | 33 | 34 | 35 | 36 | 37 | 38 | 39 | 40 |
| $Nb_2O_5$ | 8 | 8.4 | 8.5 | 7 | 8.5 | 8 | 7.9 | 7.6 | 8.7 | 9 |
| $Y_2O_3$ | 1.1 | 1.5 | 1 | 1.2 | 2 | 1.3 | 1 | 8.0 | 1.2 | 1 |
| $ZrO_2$ | 5.5 | 5.5 | 5 | 6 | 6 | 5.6 | 5.5 | 5.5 | 5.5 | 6.5 |
| ZnO | 0.5 | 1.0 | 1.5 | 1 | 2 | 1.4 | 1.2 | 1.7 | 1.7 | 2.6 |
| BaO | 1.5 | 0 | 0.3 | 2 | 0 | 0 | 0 | 0 | 0 | 2.5 |
| SrO | 0 | 0 | 0 | 0 | 0 | 0 | 0.5 | 0 | 0 | 0 |
| CaO | 0 | 0 | 0 | 0 | 0 | 0 | 0 | 0 | 0 | 0 |
| MgO | 0 | 0 | 0 | 0 | 0 | 0 | 0 | 0 | 0 | 0 |
| $WO_3$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| Total RO | 1.5 | 0 | 0.3 | 2 | 0 | 0 | 0.5 | 0 | 0 | 2.5 |
| A | 0.97 | 1.01 | 1.00 | 0.98 | 0.97 | 1.05 | 1.07 | 1.05 | 1.15 | 0.96 |
| B | 3.00 | 3.20 | 2.88 | 3.55 | 2.81 | 3.53 | 3.10 | 2.54 | 4.51 | 3.44 |
| Total | 100 | 100 | 100 | 100 | 100 | 100 | 100 | 100 | 100 | 100 |
| Nd | 2.00980 | 2.0116 | 2.0093 | 2.0025 | 2.0111 | 2.0062 | 2.0076 | 1.9973 | 2.0001 | 2.0036 |
| Vd | 28.95 | 28.65 | 29.03 | 29.18 | 28.14 | 28.95 | 29.06 | 29.19 | 29.22 | 28.00 |
| Internal devitrification resistance | A | A | A | A | A | A | A | A | A | A |
| Heat preservation temperature of internal devitrification resistance test | 950 | 965 | 970 | 970 | 975 | 960 | 975 | 960 | 970 | 960 |
| Surface devitrification resistance | A | A | A | A | A | A | A | A | A | A |
| Heat preservation temperature of surface devitrification resistance test | 950 | 965 | 970 | 970 | 975 | 960 | 975 | 960 | 970 | 960 |
| τ400 nm (%) | 76.5 | 72.1 | 76.8 | 75.7 | 74.2 | 75.8 | 76.3 | 76.2 | 73.0 | 73.1 |

As illustrated in the above embodiments, the optical glass provided in the invention is characterized by refractivity (nd) of 1.95-2.07, Abbe number (vd) of 25-35, Level B or higher surface devitrification resistance, Level A internal devitrification resistance and 68% and above at τ400 nm, and it can be widely used in the equipment such as digital cameras, digital video cameras, and camera phones.

The invention claimed is:
1. High refractivity and high dispersion optical glass, comprising:
   1 wt % to 13 wt % of $SiO_2$,
   6 wt % to 15 wt % of $B_2O_3$,
   5 wt % to 22 wt % of $TiO_2$,
   35 wt % to 60 wt % of $La_2O_3$,
   1 wt % to 15 wt % of $Gd_2O_3$,
   2 wt % to 10 wt % of $ZrO_2$,
   1 wt % to 15 wt % of $Nb_2O_5$,
   0.5 wt % to 8 wt % of ZnO,
   0 to 8 wt % of $WO_3$ and
   0 to 10 wt % of $Y_2O_3$, wherein
   the transmissivity of the optical glass is 68% and above at the wavelength of 400 nm in case the thickness is 10 mm, which is measured with the method specified in GB/T7962.12-2010,
   the optical glass has a refractivity ($n_d$) is 1.95 to 2.07,
   the optical glass has a Abbe number ($V_d$) in a range of from 25 to 35, and
   the optical glass does not contain $Ta_2O_5$ and $GeO_2$.
2. The optical glass as recited in claim 1, further comprises:
   $Sb_2O_3$ in an amount of from 0 to 0.1 wt % and
   RO in amount of from 0 to 8 wt %, wherein R represents one or more of Ba, Sr, Ca and Mg.
3. The optical glass as recited in claim 1, wherein the optical glass consist of:
   1 wt % to 13 wt % of $SiO_2$,
   6 wt % to 15 wt % of $B_2O_3$,
   5 wt % to 22 wt % of $TiO_2$,
   35 wt % to 60 wt % of $La_2O_3$,
   0 to 10 wt % of $Y_2O_2$,
   1 wt % to 15 wt % of $Gd_2O_3$,
   2 wt % to 10 wt % of $ZrO_2$,
   1 wt % to 15 wt % of $Nb_2O_5$,
   0.5 wt % to 8 wt % of ZnO,
   0 to 8 wt % of $WO_3$,
   0 to 0.1 wt % of $Sb_2O_3$, and
   0 to 8 wt % of RO, wherein R represents one or more of Ba, Sr, Ca and Mg.

4. The optical glass as recited in claim 1, wherein the optical glass comprises:
1 wt % to 11 wt % of $SiO_2$,
8 wt % to 13 wt % of $B_2O_3$,
11 wt % to11 wt % of $TiO_2$,
38 wt % to 55 wt % of $La_2O_3$,
1 wt % to 7 wt % of $Y_2O_3$,
3 wt % to 13 wt % of $Gd_2O_3$,
3 wt % to 9 wt % of $ZrO_2$,
2 wt % to 14 wt % of $Nb_2O_5$,
0.5 wt % to 6 wt % of ZnO,
0 to 0.05 wt % of $Sb_2O_3$, and
0 to 5 wt % of RO, wherein R represents one or more of Ba, Sr, Ca and Mg.

5. The optical glass as recited in claim 1, wherein the optical glass comprises:
1 wt % to 7 wt % of $SiO_2$ ,
8 wt % to 11 wt % of $B_2O_3$ ,
12 wt % to 16 wt % of $TiO_2$ ,
40 wt % to 50 wt % of $La_2O_3$ ,
1 wt % to 5 wt % of $Y_2O_3$ ,
5 wt % to 12 wt % of $Gd_2O_3$ ,
4 wt % to 8 wt % of $ZrO_2$ ,
5 wt % to 10 wt % of $Nb_2O_5$ , and
1 wt % to 4 wt % of ZnO.

6. The optical glass as recited in claim 1, wherein a ratio of the wt % of $La_2O_3$ relative to the wt % of $Y_2O_3+Gd_2O_3+ZrO_2$ satisfies the following expression:

$2.5<La_2O_3/(Y_2O_3+Gd_2O_3+ZrO_2)<7.$

7. The optical glass as recited in claim 1, wherein a ratio of the wt % of $Sio_2+B_2O_3$ relative to the wt % of $TiO_2$ satisfies the following expression:

$0.9<(SiO_2+B_2O_3)/TiO_2<1.5.$

8. The optical glass as recited in claim 1, wherein
the transmissivity of the glass provided by the invention is 70.1% to 81.3% at the wavelength of 400 nm in case the thickness is 10 mm, which is measured with the method specified in GB/T7962.12-2010.

9. The optical glass as recited in claim 1, wherein
the surface devitrification resistance is at level B or higher and the internal devitrification resistance is at level A, wherein
level A represents an optical glass in which devitrification particles are not visible to the naked eyes, and
level B represents an optical glass in which devitrified spots are present on the surface, but the devitrified spot area occupies less than 5% of the entire surface area and the devitrified spot depth does not exceed 0.5 mm.

10. A glass preform made of the optical glass according to claim 1.

11. An optical element made of the optical glass according to claim 1.

12. An optical instrument made of the optical glass according to claim 1.

* * * * *

UNITED STATES PATENT AND TRADEMARK OFFICE
CERTIFICATE OF CORRECTION

PATENT NO. : 9,487,432 B2
APPLICATION NO. : 14/600559
DATED : November 8, 2016
INVENTOR(S) : Kuang Page 1 of 1

It is certified that error appears in the above-identified patent and that said Letters Patent is hereby corrected as shown below:

In the Claims

At Column 13, Claim number 4, Line number 5, delete "11 wt % toll wt % of $TiO_2$," and insert --11 wt % to 17 wt % of $TiO_2$,--.

Signed and Sealed this
Tenth Day of April, 2018

Andrei Iancu
*Director of the United States Patent and Trademark Office*